May 25, 1965   H. G. MACDONALD ETAL   3,185,748
METHOD OF FABRICATING A MULTIPLE UNIT ASSEMBLY
Filed Jan. 27, 1961   3 Sheets-Sheet 1
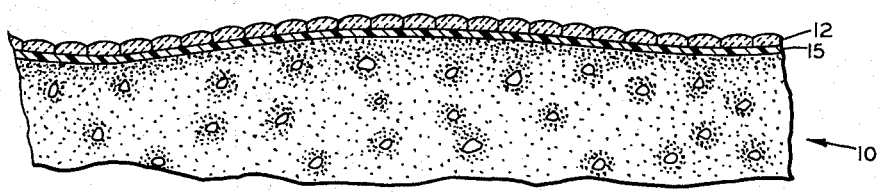
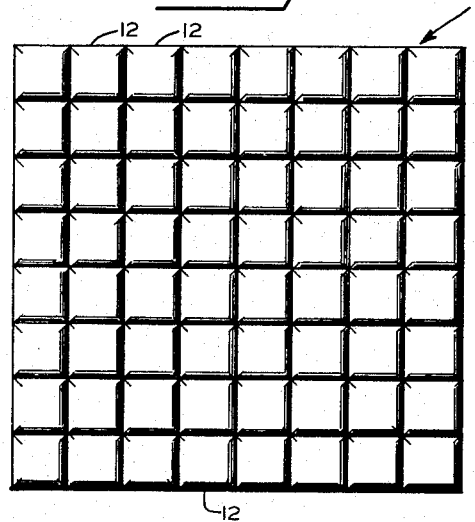
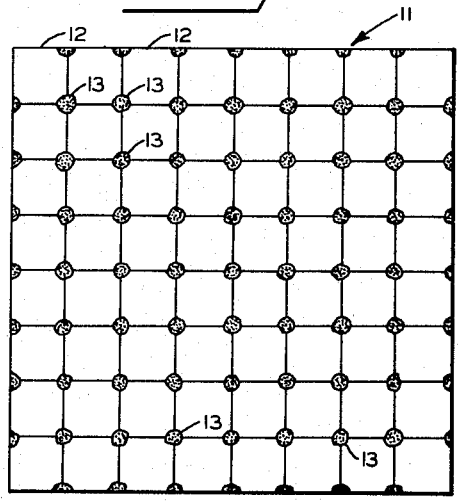
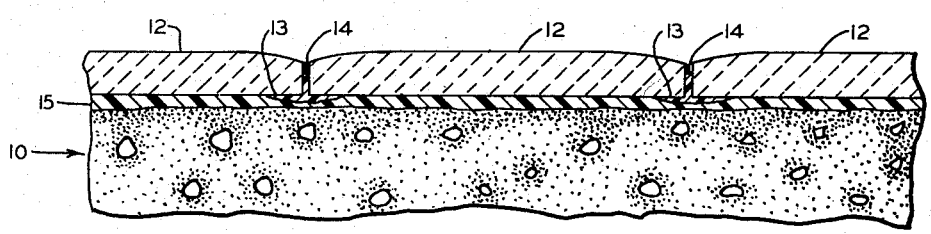
INVENTORS
HERBERT G. MACDONALD
DAVID J. BARBOUR
KARL M. CLAUS
ROBERT B. CLEVERLY
BY Owen + Owen
ATTORNEYS May 25, 1965 H. G. MACDONALD ETAL 3,185,748
METHOD OF FABRICATING A MULTIPLE UNIT ASSEMBLY
Filed Jan. 27, 1961 3 Sheets-Sheet 2
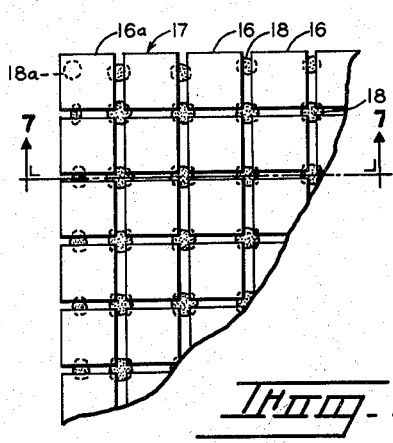
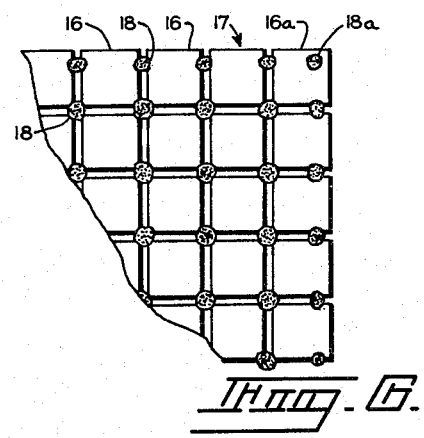
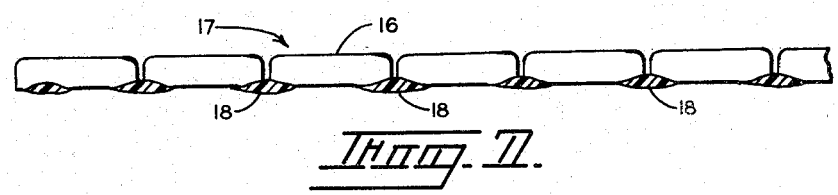
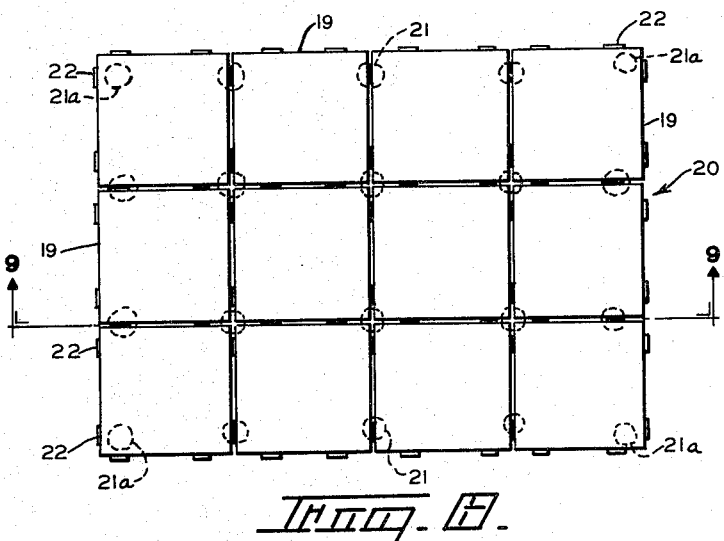
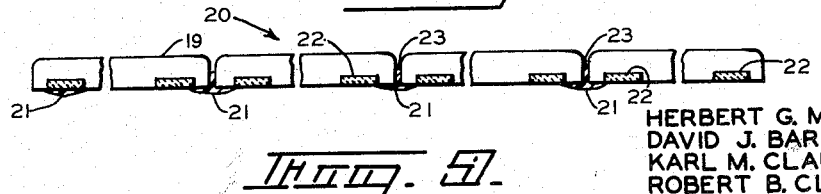
INVENTORS
HERBERT G. MACDONALD
DAVID J. BARBOUR
KARL M. CLAUS
ROBERT B. CLEVERLY
BY
ATTORNEYS

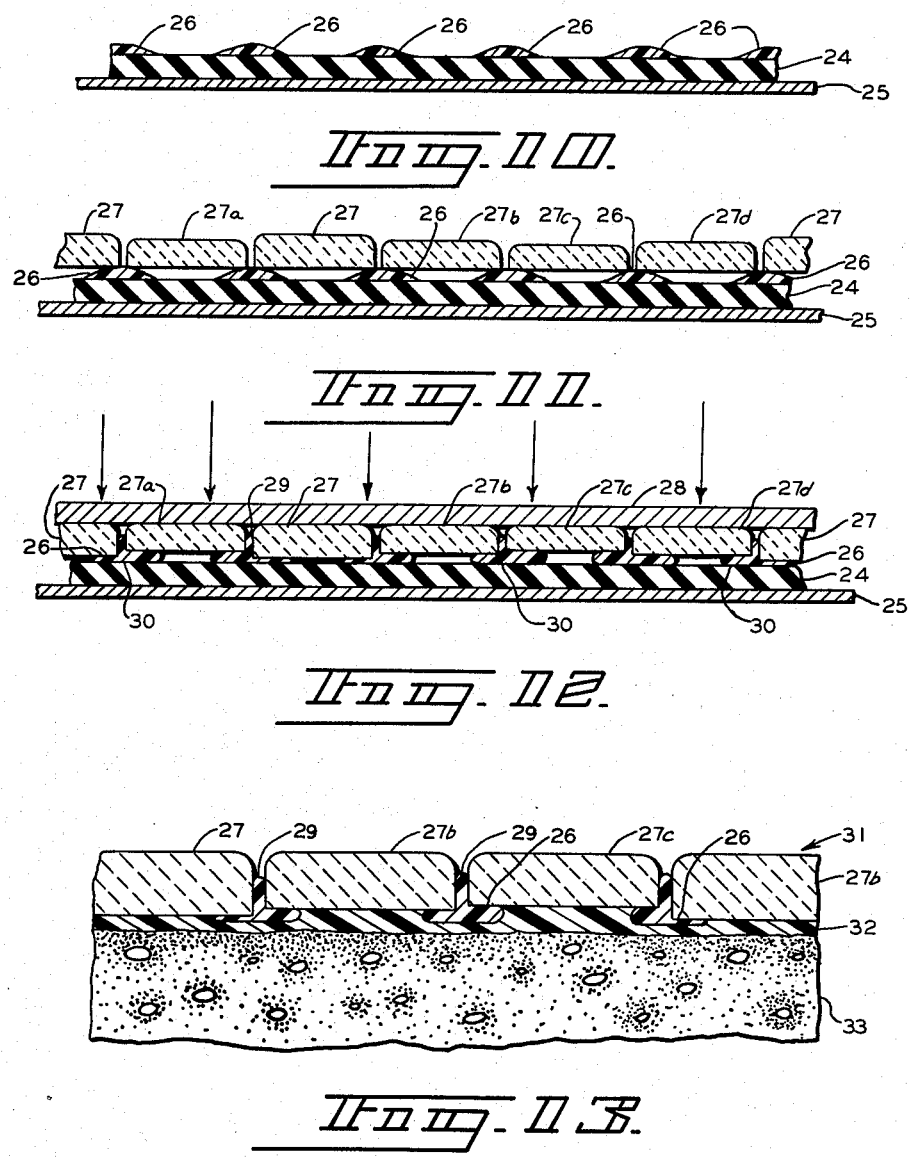

3,185,748
METHOD OF FABRICATING A MULTIPLE UNIT ASSEMBLY
Herbert G. Macdonald, Corona, Calif., and David J. Barbour, Karl M. Claus, and Robert B. Cleverly, Zanesville, Ohio, assignors to The Mosaic Tile Company, Zanesville, Ohio, a corporation of Ohio
Filed Jan. 27, 1961, Ser. No. 85,367
1 Claim. (Cl. 264—261)

This invention relates to methods for the fabrication of multiple unit tile assemblies such as those disclosed in copending application Serial No. 785,917, filed January 9, 1959, by Messrs, Macdonald, Barbour and Claus, now Patent No. 3,041,785.

The earlier application Serial No. 785,917, disclosed a method for fabricating a flexible assembly of ceramic tiles and a ceramic tile assembly fabricated thereby wherein the invention consisted of an assembly of a multiplicity of small ceramic tile pieces, for examples 1" x 1", 1½" x ½" or 1" x 1½", into a modular unit comprising a sufficient number of these small pieces of ceramic tile to form a tile unit, say, 9" x 9" square or 1' x 1' or 6" x 9", for examples, and of a method for fabricating such assemblies.

The present invention constitutes a carrying forward of the invention of the previous application and the utilization of the teachings of that invention not only for the production of such modular multiple unit tile assemblies, but also the production of multiple unit assemblies of larger size where each of the individual tile pieces may be, for example, 4¼" x 4¼" in size and a group of them assembled according to the invention to facilitate their handling and laying.

In the earlier application, the principal objective consisted of providing an assembly of a multiple number of complementary ceramic tile pieces illustrated by a unit primarily adapted for setting or laying by amateurs in the "do- it-yourself" field, and wherein the individual ceramic pieces were assembled and held in edge-to-edge juxtaposition with selected spacing between adjacent individual pieces and with sufficient flexibility in the units thus assembled to provide for their placement upon irregular and uneven surfaces.

It is the principal object of the present invention to provide a multiple unit tile assembly wherein the individual pieces of tile are assembled to each other by readily placeable, permanent connecting means which not only hold the tiles together as a unit or assembly, but which also maintain spacing between individual tiles either in adjacency or in controlled spaced relationship to provide for even grout lines between the individual tile pieces.

Many types of multiple unit tile assemblies have been suggested in the past utilizing various connecting means which extend across either the front or back faces of tile pieces. For example, United States patent to Munro No. 762,428 suggests the assembly of groups of tiles by the use of sheets of paper adhered to their front faces and by the use of a perforated sheet material adhered to their back faces. Munro suggests specifically an open mesh fabric adhered to the back faces of the tiles by an adhesive, the open mesh fabric being intended to be left in the setting bed or adhesive by which the group of tiles is adhered to the floor or wall.

United States patent to Schmohl 2,265,614 of 1941 teaches the use of a coarse mesh impregnated with cement and adhered to the back of the tiles by the cement. Schmohl suggests the making of the threads of the open mesh backing from jute.

Dratler United States Patent No. 2,678,896 of 1954 teaches the mounting of the tile pieces upon buckram strips and the subsequent mounting of the buckram strips upon a heavy backing such as cork or wire cloth.

United States patent to Talbott 2,844,955 teaches the use of strips of sheet material, for example, plastic tape adhesively coated and adhered to the edges of adjacent pieces of tile, the tapes extending across the backs of the tile to which they are adhered.

Hartlmair United States Patent No. 2,741,909 suggests the assembly of numbers of pieces of tile by the use of small pieces of gummed paper stuck to the backs of the tiles and extending across the joints between adjacent pieces of tile.

All of these prior suggestions have one great fault in common, namely, the fact that the material utilized for assembling the individual pieces of tile to each other extends only across the planar backs of the individual tile pieces (or, of course, across the planar faces), so that the integrity of a group of tiles thus assembled to each other depends solely upon the degree of adherence of the distinct backing material to the back or front faces of the tile pieces. Such systems require (1) a suitable sheet-like backing material, (2) an adhesive capable of adhering the sheet-like material to the tile surfaces tightly enough so that the tiles will not readily come away and (3) a backing material of sufficient flexibility to permit accommodation of the multiple tile assembly to at least somewhat irregular surfaces and yet sufficient stiffness so as to give the assembly integrity and permit its being handled readily as a multiple unit assembly.

The principal object of the present invention is achieved by providing a multiple unit tile assembly wherein the individual pieces of tile are held in assembled form and accurate, spaced relationship by the use of only a single medium and in which that medium provides sufficient flexibility yet adequate stiffness, retains the tile pieces in their accurate spacing either against or remote from each other, and furthermore provides for a bracing of the tile assembly by the giving thereto of a beam-like strength.

It is a further object of the instant invention to provide a multiple unit tile assembly wherein the individual tile pieces are retained in their assembled relationship by retaining means covering but a small percentage of their rear surfaces thus leaving the major area of such surfaces exposed for direct contact with the setting medium by which the tile pieces are adhered to a floor or wall.

It is yet another object of the instant invention to provide a multiple unit tile assembly wherein the individual pieces of tile are held in assembled form by small thin bodies of suitable resinous material capable both of adhering firmly to the surfaces of the tile and of retaining the individual tiles in their desired spacing within the assembly.

It is yet another object of the instant invention to provide a multiple unit tile assembly wherein the individual tiles are held in spaced relationship providing for uniform grout lines between the individual pieces of a single assembly by means of small masses of suitable resinous adhesive adhered in thin layers to the rear faces of the tiles at their corners or edges and extending in thin sections upwardly between the adjacent sides of spaced tiles, the resinous adhesive also adhering strongly to the sides of such tiles and providing a beam effect for the entire assembly giving it unit rigidity to facilitate its handling.

The instant invention includes both the multiple unit assembly and the combination of method steps by which it is assembled; in particular, those steps which provide for complete utilization of all of the advantages available from the use of the single assembly medium—i.e., the small resinous masses which adhere the tiles together and also retain them in the relationship desired.

Other and more specific objects and advantages of the instant invention will be better understood from the specification which follows, and from the drawings, in which:

FIG. 1 is a fragmentary, vertical, sectional view through a portion of a supporting floor over which a plurality of tile assemblies according to the invention have been laid;

FIG. 2 is a plan view of a multiple unit assembly of small ceramic tiles fabricated according to the invention and spaced in virtually edge-to-edge relationship;

FIG. 3 is a plan view of the rear surface of the assembly of tiles shown in FIG. 2;

FIG. 4 is a fragmentary, vertical, sectional view on an enlarged scale, of a portion of an assembly of ceramic tiles fabricated according to the invention and shown in place on a floor or wall.

FIG. 5 is a fragmentary plan view of a portion of an assembly of relatively small ceramic tiles fabricated according to the invention and providing for a fixed, uniform grout line spacing between adjacent tiles;

FIG. 6 is a fragmentary plan view of the rear surface of portions of the assembly illustrated in FIG. 5;

FIG. 7 is a fragmentary view taken along the line 7—7 of FIG. 5 and shown on an enlarged scale;

FIG. 8 is a plan view of a multiple unit tile assembly of larger tiles, for example 4¼" x 4¼" in size, assembled according to the invention to provide for a uniform grout line and proper flexibility and stiffness as is further discussed below;

FIG. 9 is a fragmentary, vertical, sectional view taken along the line 9—9 of FIG. 8;

FIG. 10 is a diagrammatic view in section showing a first step in a method of fabricating an assembly according to the invention;

FIG. 11 is a view similar to FIG. 10 and showing a second step in the method;

FIG. 12 is a view similar to FIG. 11, and showing a third step in the method; and FIG. 13 is a vertical sectional view showing a number of individual units of tile as assembled by the method illustrated in FIGS. 10, 11 and 12 and shown in place on a floor or wall.

For purposes of illustration throughout the description of FIGS. 1–7, a multiple unit tile assembly consisting of 64 square, individual tile pieces, say, of 1" x 1" size assembled in either edge-to-edge relationship (FIGS. 1, 2 and 3), or in spaced relationship (FIGS. 4–7) will be described. It is to be appreciated, of course, that this particular number or this particular size of individual tile pieces is merely illustrative and that the invention includes within its scope the provision of multiple unit tile assemblies of other numbers, dimensions and shapes of tile pieces and other shapes and sizes of assemblies thereof.

The invention also includes within its scope the assembly of tile pieces of more than one size or shape into assemblies according to the invention, it being necessary, of course, under these conditions that the tile pieces be appropriately shaped so as to fit together when assembled, with or without grout line spacing, to provide solid masses of tile.

In FIGURE 1 of the drawings, a concrete support floor is generally indicated at 10. The concrete floor 10 shown is merely illustrative, i.e., the multiple unit tile assemblies of the invention are intended for use on either floors or walls and upon virtually any material and no limitation as to the use of multiple unit tile assemblies according to the invention is intended by this illustration.

A flexible, multiple unit tile assembly according to the invention is generally indicated at 11 in FIGS. 2 and 3. In this illustration there are shown 64 individual, square, ceramic pieces 12 assembled according to the invention to form the unit 11. Each of these individual pieces 12 of tile may be identical with the other pieces or it may differ in color, shape or size according to the desired pattern. For examples, individual tiles 12 of square, triangular, etc., shapes may be used together and the colors may be chosen according to any of many color pattern schemes. The quality of being able to be used together in such assemblies is hereinafter referred to as "complementary."

The individual pieces of tile 12 are assembled together either in assemblies of definite modular sizes as illustrated in FIGS. 2 and 3, or they may be assembled in sheets having almost any desired width and length. For example, instead of there being merely 64 individual pieces 12 in an assembly 11 according to the invention, the assembly might be six or eight feet wide and, due to the flexibility of such an assembly, the length might be as many as, say, 10 or 20 feet with the entire sheet rolled up so that it can be unrolled when the floor or wall has been suitably prepared for its reception.

In assembling a plurality of individual pieces 12 according to the invention, they are arranged in inverted position upon a flat surface. For example, in fabricating the multiple unit tile assembly 11 of FIGS. 2 and 3, the group of 64 individual pieces 12 is placed on its face, with all of the rear surfaces uppermost, in an assembly box or tray or on an assembly belt or table. After the individual pieces 12 are thus placed in this case in substantially edge-to-edge contact, suitable means are actuated for depositing at each of the adjacent corners of contacting tiles, a small mass of liquid resinous bonding material 13.

While the particular constituents of the resinous mass do not per se constitute a part of the instant invention, and numerous types of resinous bonding materials or adhesives may be employed in practicing the invention, the resinous masses 13 must have certain essential characteristics. These include:

(1) The material must adhere tightly to the back surfaces of the individual ceramic pieces 12 in the assembly 11. In the event that the tile assembly is one in which the ceramic pieces are spaced from each other (FIGS. 4–9), the resin must also adhere to the edge portions of the individual ceramic pieces as will be later discussed.

(2) The material must remain flexible even after it is "set up" or cured.

(3) The material must retain sufficient stiffness, particularly in compression and tension, so as to retain the tile pieces in edge-to-edge relationship (FIGS. 2 and 3), or in spaced relationship (FIGS. 4–9).

(4) The material must be compatible with the usual bonding materials or setting materials used in adhering ceramic tiles to surfaces.

(5) The material must retain these characteristics even in a very thin layer and even in a thin layer having a substantial "feather edge" for reasons which will be discussed below.

(6) The material must be non-staining to alkaline products such as standard grouting for ceramic tile which has Portland cement at its base ingredient.

(7) The material must retain its flexibility within the limitations described and its rigidity within other limitations at the temperatures encountered in the handling and setting of the assemblies.

(8) The material must be capable of successfully retaining its bond to the tile pieces with the least possible area of the tile being covered by the resinous material— say, 10% of the surface area or less.

(9) The material must be resistant to moisture and to weak acids and alkalis.

In addition, of course, the resinous material employed must be one which will not be injurious to the instruments used in setting ceramic tiles; for example, diamond wheels or other tools.

Suitable adhesives possessing the necessary qualities for use according to the invention are disclosed below.

Example A

An adhesive compounded from the following constituents:

| | Cc's. |
|---|---|
| Emulsion "A" | 432 |
| Glyoxal | 5 |
| Dibutyl phthalate | 21 |
| A glycol [1] | 32 |

[1] E.g., diethylene glycol or hexylene glycol.

Emulsion "A" in the above formulation is a dispersion of polyvinyl acetate in water containing about 55.3% solids, polymerized to such a degree that it has a Brookfield viscosity of 1454 cp. @ 20° C. with less than 1% of vinyl acetate monomer by weight and a pH of 4.42. It may be purchased on the market by these specifications.

The glyoxal, dibutyl phthalate and diethylene or hexylene glycol in the above formulation are conventional constituents and are used herein for their usual purposes.

Example B

An adhesive compounded from the following constituents:

| | Parts by weight |
|---|---|
| Resin A | 100 |
| Flexibilizer B | 100 |
| Filler | 100 |
| Accelerator | 10 |

Resin A in this formulation is a reaction product of epichlorhydrin with bisphenol A, the product having a viscosity at 23° C. of 4500 centipoises and having epoxide value of 263.

Flexibilizer B is a polysulphide polymer [1] having a viscosity at 25° C. of 950 centipoises and a molecular weight of 1000.

The filler is a hydrated aluminum silicate having a particle size 99.75% of which is minus 325 mesh.

The accelerator is diethylene triamine.

The individual tile pieces 12 of the assembly according to the invention as illustrated in FIGS. 2 and 3, are shown in close edge-to-edge juxtaposition, but actually and preferably they should not be in tight contact, at least in some instances, in order to provide for flexibility of the assembly. While the assembly 11 of FIGS. 2 and 3 is intended to be set without grout lines between either the individual pieces 12 or adjacent assemblies 11, a thin spacing between the edges of the individual pieces 12 is advantageous since it provides for the intrusion of very thin layers of the adhesive material between adjacent pieces 12, as is shown by the intruding material 14 (see FIG. 4). These thin intrusions add to the surface contact between the adhesive material 13 and the tile pieces 12, thus strengthening the assembly; they function to provide additional rigidity to the assembly 11 by reason of their being spaced upwardly from the plane of the rear surface of the tile pieces 12 a distance greatly in excess of the thickness of the individual masses 13 on the backs of the tile pieces 12; and they provide for a body of the resinous material which prevents the individual tile pieces 12 from being chipped or worked against each other as the assemblies 11 may be bent for example, in fitting the floor 10 as shown in FIG. 1 or in rolling up a larger sheet assembled according to the invention. The particular spacings shown in FIG. 4 are, of course, merely illustrative and, in actuality, the relative thickness of the intrusions 14 to the dimensions of the pieces 12, would be much less.

It should be noted that an assembly of tile pieces according to the invention, whether in virtual edge-to-edge relationship or in spaced grout-line relationship, is not intended to be curved around short radii as at the corners between floors and walls. It is, however, intended and usable on an uneven surface such as a typical basement floor, and can by reason of its flexibility be adhered to such a surface without the use of a setting bed to compensate for the unevenness of the floor. Thus, in FIGURES 1 and 4, the tile assemblies 11 and individual pieces 12 are shown as adhered to the floor 10 by a thin layer of adhesive 15. Of course, in these figures the layer of adhesive 15 is shown much thicker relative to the thickness of the tile pieces 12 than would be true in an actual installation.

It should also be noted, particularly in FIG. 4, that the thin resinous bodies 13 are much thinner than even a thin setting adhesive which is conventionally used in thicknesses of between 1/32" and 1/16". Here, an assembly of tile according to the invention has a distinct advantage over an assembly of tile pieces made by adhering a stiff mesh to the backs of the tiles because, in order for the mesh to have sufficient stiffness to prevent changes in the spacing of the individual tile pieces, it has to be so thick that it is difficult to embed it in an adhesive of customary thickness. As a result of the necessity for thick mesh backing materials, the use of assemblies held together by such materials is almost limited to placement in cement setting beds. When placed by a thin adhesive such mesh backing materials are likely to cause an uneven surface.

Resinous materials such as those discussed herein have been found to be adequate for accomplishing all of the objectives of the invention wherein not more than from, say 5% to 15% of the surface areas of the tile pieces 12 are covered by the adhesive masses 13. Thus a maximum percentage of the surface area is left exposed to provide for a maximum surface contact of the tile pieces 12 with the adhesive layer 15 or the cement setting bed.

The modular assemblies of FIGS. 2 and 3 are designed for and intended to be used by persons in the same manner that "tiles" of rubber, asphalt and vinyl materials are currently laid in "do-it-yourself" operations. A person laying a tile assembly embodying the invention need only clean the surface of the wall or floor and remove any abrupt irregularities in the same manner in which it is necessary to prepare such a floor or wall for the laying of these other "tiles" of asphalt, rubber, vinyl, and the like. The person then spreads a thin layer of surface bonding adhesive over the supporting floor or wall and can then lay the modular assemblies 11 in edge-to-edge juxtaposition. Furthermore, even though resinous materials such as those disclosed herein possess the characteristics set forth above, a modular tile assembly 11, say, of 8" x 8" size, can readily be reduced in its size without the necessity for cutting the ceramic pieces 12. The necessity for cutting ceramics has heretofore limited their utilization by persons who did not possess suitable ceramic handling devices such as solution-cooled diamond wheels of the type utilized by professional tile setters. In almost any installation it is necessary to cut smaller pieces in order to fit odd spacings or round protruding objects. In the use of assemblies 11 according to the invention, such person may reduce each modular unit to small pieces by the use of a sharp knife slipped between adjacent pieces 12 and with which the resinous masses 13 readily may be cut.

A second embodiment of the invention as modified to provide for grout lines between individual ceramic pieces, but still utilizing small ceramic pieces, is illustrated in FIGS. 5–7. In these figures, a plurality of individual pieces 16 are shown as assembled to form the multiple unit tile assembly 17 according to the invention. The tile pieces 16 are held together and in spaced relation by a plurality of small masses 18 of resinous material of the type discussed herein. As in the case of the embodiment of the invention illustrated in FIGS. 1–4, an assembly 17 is made by placing the individual pieces 16 on a suitable assembly box, tray or belt and then depositing on the rear faces thereof the small masses of resinous material

---

[1] See "Epoxy Resins" by Lee and Neville (McGraw-Hill, N.Y., 1957), page 173.

18. In this embodiment of the invention, wherein the individual pieces 16 are desired to be spaced from each other to provide for a uniform grout line, some of the material in each of the inter-tile masses 18 penetrates or intrudes into the spaces between adjacent pieces 16. This is best illustrated in FIG. 7 where each of the masses of resinous material 18 is shown as having intruded into the spaces between all of the pieces 16 (FIG. 7) and that row of pieces 16, thereadjacent (see FIG. 5).

As discussed above, the resinous masses 18 not only provide for integrity of the assembly 17, but by reason of intruding upwardly between and firm adhesion to the sides of adjacent pieces 16, the resinous masses 18 provide a "beam effect," lending to the assembly 17 a rigidity not possessed by assemblies wherein the assembling sheet or mesh extends only across the backs of the individual pieces 16.

In FIGS. 5 and 6 there is also indicated an odd mass or dot of resinous material 18a at the outer corner of a corner tile 16a. This mass 18a does not, of course, function to retain tile pieces 16 in the assembly 17 but is placed at this position to support the outer corner of the corner tile 16a when the assembly 17 is placed on a floor or other surface. It will be appreciated, of course, that the thin set adhesive layer or the setting bed into which the assembly 17 is pressed is displayed by the thin portions of the masses 18 extending below the plane of the rear surfaces of the tile pieces 16 and flows to fill in the space between the masses 18, even intruding to a slight extent into the narrow spaces between adjacent pieces 16. Where a definite grout line is desired, as in this case, the assembly 17 is placed either in a thin set adhesive which is not thick enough to fill all of the spaces between adjacent pieces 16 or it is pressed into a setting bed only to such a distance that the setting bed cement flows upwardly into the spaces between adjacent tile pieces 16 a short distance so that it will be covered by the grouting material afterwards spread and set in the grout line spaces.

A third illustration of a multiple unit tile assembly according to the invention is shown in FIGS. 8 and 9. In this illustration, twelve individual pieces 19 of ceramic tile, say, 4¼" x 4¼" in size, are assembled and maintained to form an assembly 20 according to the invention by individual masses 21 of suitable resinous material such as those discussed above. Corner support masses 21a are employed on the corner tile pieces. The individual tile pieces 19 of this illustration are provided with grout line spacing lugs 22 each of which extends horizontally beyond the edge of its tile piece 19 a distance equal to one-half of the grout line width. As in the earlier illustrations of the invention, individual masses 21 of resinous material not only retain the tile pieces 19 in the assembly 20, but also serve to prevent displacement of individual tile pieces 19 from the desired spacing. In this case, the strength under tension of the resinous masses 21 comes into play because too close approach of the tile pieces 19 to each other is prevented by the spacing lugs 22. Again, the resinous masses 21 intrude into the spaces between adjacent tiles 19 forming thin reinforcing masses 23 to add strength and rigidity to the assembly 20. As discussed above, the intrusion of the thin masses 23 and their adhesion to the sides of adjacent tile pieces 19 creates a "beam effect" by reason of the greater distance above the plane of the backs of the tile pieces 19 through which the intruded masses 23 extend than the thickness of the portion of the masses 21 which adhere to the back faces of the tiles 19.

FIGURES 10, 11 and 12 of the drawings show three successive steps in a method for fabricating multi-unit tile assemblies according to the invention and FIGURE 13 shows a portion of a multi-unit tile assembly fabricated by the method described with respect to FIGURES 10, 11 and 12 and placed upon a floor or wall by the use of an adhesive or setting cement.

In carrying out the method of the invention in this form, the tile assembly is fabricated on an assembly means such as the conveyor belt 24 (FIG. 10) which has an upper planar surface and is supported, for example, by a flat support plate 25. In this method, individual masses 26 of the resinous material are placed upon the assembly belt 24 and spaced from each other according to the spacing between the adjacent corners of individual tiles to be assembled together. For purposes of illustration in FIGURES 10–13, the tiles are shown as being relatively small, all of the same size and plan configuration, and of a thickness much greater relative to their lateral dimensions than actually would be the case.

After the placing of the masses 26 of resinous material on the assembly belt 24, a plurality of individual tile pieces 27 is placed on and in contact with the masses of resin 26 (FIG. 11). It will be observed that in the method illustrated the final assembly will be one in which the individual tiles 27 are held in spaced relationship from each other to provide for narrow, uniform grout lines between adjacent tiles. The arrangement of the individual tile pieces 27 in an assembly according to the invention may be generally spoken of as "side-by-side" and that term is intended to include both (1) arrangements where the tiles of the assembly are in contact with each other and (2) arrangements in which the tiles of the assembly are spaced from each other to provide for grout lines. In either case, individual tile pieces which are positioned next to each other or side-by-side, will be spoken of as "adjacent tiles," whether or not they actually contact each other.

It will be observed by reference to FIGURE 11 that certain of the individual tile pieces 27, for example, those indicated by the reference numbers 27a, 27b, 27c and 27d, are not as thick as the tiles indicated by the reference number 27 without suffix. The differences in thickness of the tile pieces 27, 27a, b, c and d are exaggerated in FIGURES 11, 12 and 13, for purposes of illustration. Although differences of thickness actually are quite common in commercially produced ceramic tiles, they actually differ by only a few thousandths of an inch.

When the tile pieces 27 are placed upon the masses of resin 26, as shown in FIG. 11, the upper surfaces of the tile pieces 27 all lie in parallel planes but because of the variation in thickness of the pieces 27 their upper surfaces or front faces do not all lie in the same plane. The tile assembly of the invention and a method for producing the same eliminates the problem of uneven face surfaces of a tile floor or wall by compensating for variations in thickness of the individual tile pieces. This is accomplished by the use of a platen 28 (FIG. 12) which is pressed against the upper faces of the tile pieces 27, squeezing them downwardly so that their lower corners are forced into the individual masses 26 of resinous material. As can be seen in FIGURE 12, forcing the individual tile pieces 27 downwardly causes the resin in the masses 26 to be both squeezed horizontally and vertically intruded into the spaces between the tiles 27, as for example the portion 29 of FIG. 12. The resinous masses 26 are pressed against the backing surface formed by the assembly belt 24 and backup plate 25 so as to produce at least planar portions 30 on the back surfaces of the masses of resin 26. The resin is then cured or set-up.

As a result of these four assembly steps, the assembly of tile pieces has a planar front surface comprising the front faces of the individual tile pieces 27 which all lie in the same plane regardless of the thickness thereof. It also has a planar back surface comprising the planar portions 30 of the back surfaces of the resin masses 26 which planar surface permits the entire assembly to be laid flat during handling, to be stacked with other similar assemblies and to be readily emplaced in either a thin setting adhesive or a setting bed. In FIGURE 13 a fragment of a multi-unit tile assembly according to the invention is generally indicated at 31 and the fragment 31 includes part of one of the tiles 27 of standard thickness and the tiles 27b, 27c and 27d of different thicknesses. The material of the setting adhesive or setting bed, generally indicated by the reference number 32, fills in the spaces between the masses of resin 26 and compensates not only for the differences in the thickness of the tile pieces 27, 27b, 27c and 27d, but also for any surface irregularities in a main surface such as a floor indicated by the reference number 33.

A multiple unit tile assembly according to the invention thus possesses the ability to compensate for variations in thickness of the tile pieces as well as to permit the assembly to be mounted upon irregular surfaces with thin adhesive layers without resulting in there being irregularities in the surface of the finished floor or wall. In contrast, where backing sheets of thin paper or, even worse, of thick open meshes, are employed for assembling groups of tile pieces, the reference plane for all of the tile pieces is the backing sheet itself. This either retains the tile pieces with their back faces all lying in a single plane or allows them to accommodate for varying thicknesses only to the relative minor degree with which the backing sheets can be stretched or torn away from individual pieces of tile during setting. Of course, in such cases, the backing material cannot function to retain the tiles with all of their front faces lying in a single plane during handling nor can it retain the tiles in such position during the time that the adhesive or setting bed is soft and prior to the time when the adhesive or setting bed hardens or sets up to retain the tiles permanently.

We claim:

A method for fabricating an assembly of a plurality of individual complementary ceramic tile pieces, each of said pieces having front and back major faces and edge surfaces, said major faces being at least substantially parallel and spaced from each other and said edge surfaces extending between and generally normal to said front and back major faces, said method comprising (A) placing measured, discrete masses of settable resin on a planar surface in a spaced pattern, (A-1) each of said discrete masses of resin being of a size sufficient to contact only edge portions of said back surfaces of at least two of said pieces in such selected spaced relationship and to contact only portions of said edge surfaces of the same ones of said pieces contiguous to said portions of said back surfaces and for bridging and fully occupying the space between said portions of said edge surfaces, (A-2) said pattern of masses of resin being arranged so that each of said tile pieces receives at least two of said masses for bonding each of said pieces to at least two adjacent pieces, (B) arranging a plurality of said pieces with the front ones of their major faces turned in the same direction and their edge surfaces in selected spaced relationship, (C) engaging the front major faces of all of said pieces with a planar platen, (D) moving said platen into a position parallel to said planar surface and spaced therefrom a distance only slightly greater than the maximum thickness of said pieces with the arranged pieces oriented relative to the spaced pattern of said masses such that each of said masses is aligned with the spaces between the tile pieces to be contacted thereby (D-1) and, simultaneously, pressing said back major faces against said small discrete masses of settable resin, (D-2) and flattening the backs of said masses of resin against said planar surface, (D-3) and forcing intrusions of said resin into the spaces between said portions of said edge surfaces of adjacent pieces and (D-4) directly into contact with said portions of said edge surfaces; the resin in said masses being compatible with adhesives for retaining said assembly on a surface, and capable of being set up to a condition in which it is (a) stable at room temperature, (b) flexible to a degree providing for slight angular movement of adjacent pieces relative to each other, (c) resistant to deformation, (d) capable of maintaining said pieces in said selected spaced relationship, (e) preventing engagement of adjacent tile pieces with each other and (f) resisting separation of adjacent tile pieces, all under forces normally encountered in shipping, handling and laying such assemblies, (E) setting up such resin to securely bond said masses of resin directly to and in contact with said portions of said back faces and said edge surfaces of said pieces and (F) removing said assembly from said planar surface.

References Cited by the Examiner

UNITED STATES PATENTS

| | | | |
|---|---|---|---|
| 418,840 | 1/90 | Hettich. | |
| 1,507,085 | 9/24 | Newman | 50—272 X |
| 2,018,711 | 10/35 | Elmendorf | 94—18 X |
| 2,151,597 | 3/39 | Hamilton | 50—344 X |
| 2,339,489 | 1/44 | Kublanow | 50—272 X |
| 2,378,801 | 6/45 | Sidell et al. | 50—268 X |
| 2,781,554 | 2/57 | Robinson | 18—61 |
| 2,844,955 | 7/58 | Talbott | 50—344 |
| 2,850,890 | 9/58 | Rubenstein | 50—268 X |
| 2,962,409 | 11/60 | Ludlow et al. | 264—261 |
| 3,041,785 | 7/62 | MacDonald et al. | 50—343 |

FOREIGN PATENTS 519,364    3/40    Great Britain.

OTHER REFERENCES

Architectural Forum; page 126; July 1946.

JACOB L. NACKENOFF, *Primary Examiner.*

WILLIAM I. MUSHAKE, EARL J. WITMER,
*Examiners.*